No. 877,490. PATENTED JAN. 28, 1908.
S. E. DaVIS.
EGG CANDLING MACHINE.
APPLICATION FILED NOV. 8, 1907.
2 SHEETS—SHEET 1.
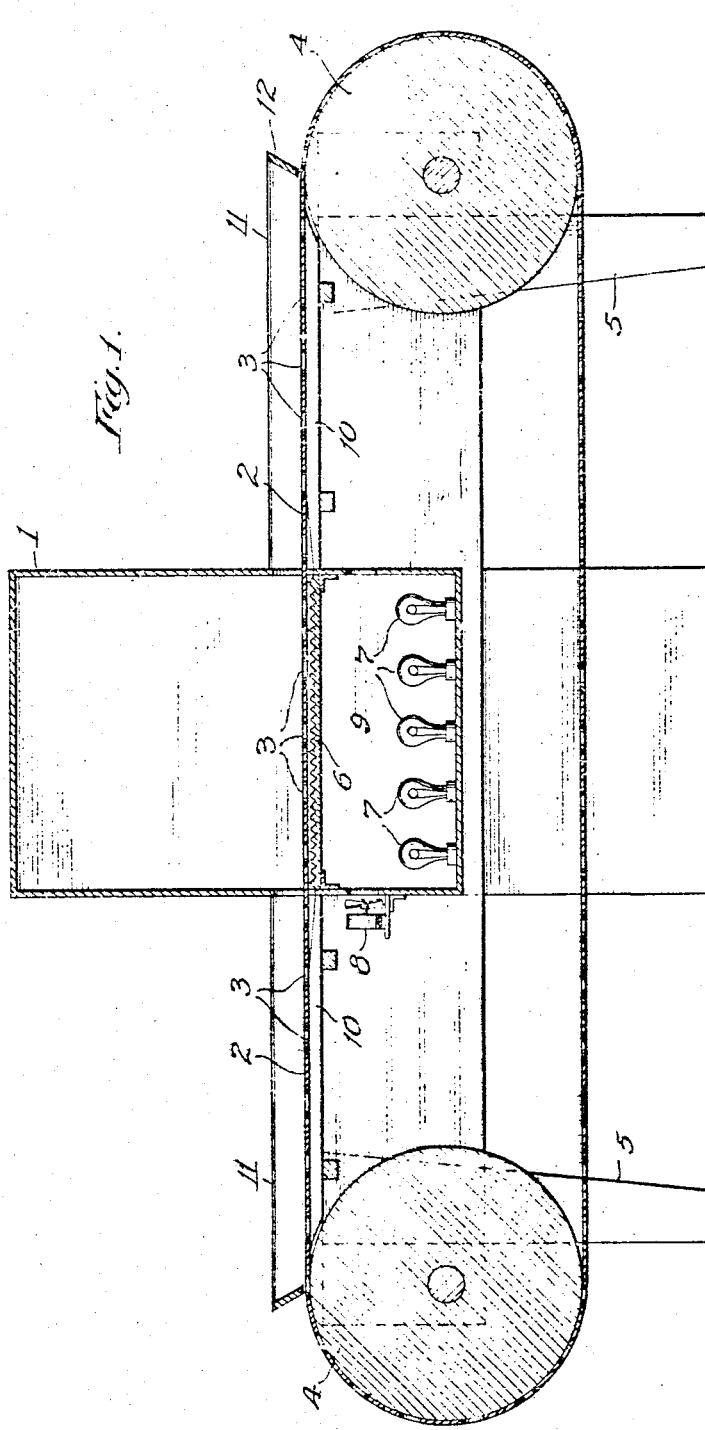

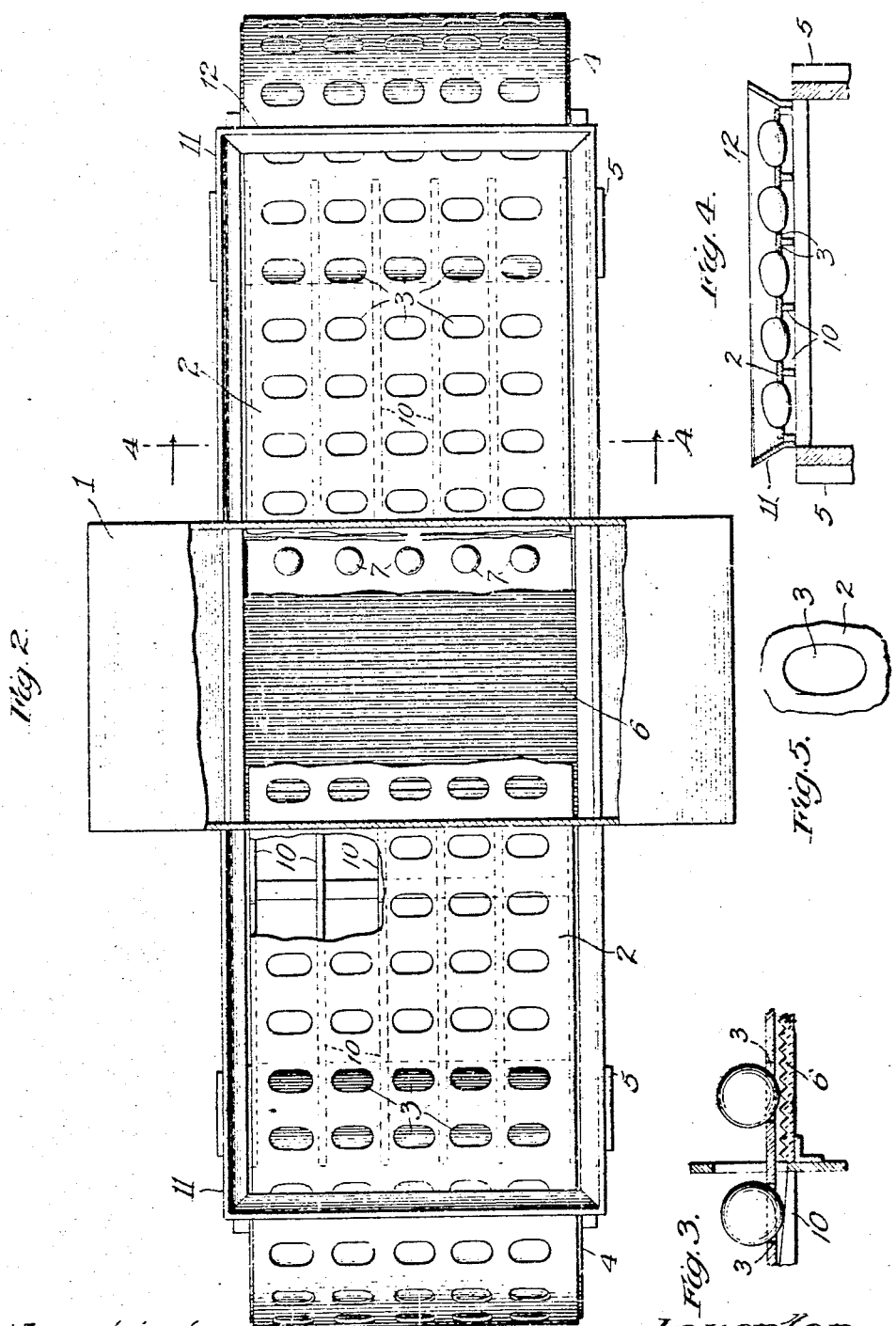

UNITED STATES PATENT OFFICE.

SAMUEL EDWARD DAVIS, OF ELGIN, ILLINOIS.

EGG-CANDLING MACHINE.

No. 877,490.  Specification of Letters Patent.  Patented Jan. 28, 1908.

Application filed November 8, 1907. Serial No. 401,278.

*To all whom it may concern:*

Be it known that I, SAMUEL EDWARD DAVIS, a citizen of the United States of America, and a resident of Elgin, county of Kane, State of Illinois, have invented certain new and useful Improvements in Egg-Candling Machines, of which the following is a specification.

The main objects of this invention are to provide an improved form of machine for candling or inspecting and judging the quality of eggs by viewing them when held before a strong light; to provide a machine of this class in which a large number of eggs may be carried upon an endless belt so as to pass in succession across a light in a dark room and to rotate the eggs during such passage; to provide an improved construction whereby the eggs are rolled across a transparent surface through which the light shines and whereby the spaces between the eggs are screened against the passage of light; to provide an improved construction for apparatus of this character whereby a powerful light may be used for the purpose of candling the eggs without danger of causing the quality of the eggs to be affected by the heat of the light; to provide an improved form of conveyer for carrying eggs in a device of this class; and to provide improved means for preventing the sagging of a belt of flexible material which is perforated to provide seats for supporting eggs. These objects are accomplished by the device shown in the accompanying drawings, in which—

Figure 1 is a longitudinal section of an egg candling machine constructed according to this invention. Fig. 2 is a top plan of the same partly broken away, the walls of the dark room being shown in section. Fig. 3 is a detail illustrating the lifting of the egg in its seat in the belt through contact with the transparent partition. Fig. 4 is a transverse section of the conveyer on the line 4—4 of Fig. 1. Fig. 5 is a fragmentary detail of the belt, showing the preferred shape of aperture.

In the construction shown in the drawings, the apparatus comprises a housing 1, through which passes in a substantially horizontal position the endless belt or conveyer 2. The belt 2 is constructed of flexible material, preferably leather, and is provided with a plurality of perforations 3 arranged in intersecting rows. Each perforation is preferably of substantially elliptical form (see Fig. 5) so that an egg may be seated therein with its axis or long dimension horizontal and with its narrow end facing either side.

The belt 2 is carried by a pair of pulleys 4 mounted in the supporting frame 5. The housing 1 is considerably wider than the belt so as to provide a space at each side of the conveyer, within which the inspector or "candler" may stand. Immediately below the belt and extending across substantially the entire length of the housing is a transparent screen or partition 6 lying parallel with the belt and preferably formed of glass having a roughened upper surface, as, for instance, prism glass. As will be seen from Fig. 3, the eggs project below the lower surface of the belt when resting in the apertures 3. The upper surface of the partition 6 is so located with respect to the belt that the eggs, in passing over the partition, will be supported thereby and lifted slightly in their seats so that the traveling of the belt will cause the eggs to roll, thus permitting the "candler" to view the eggs from all sides and insuring the detection of any imperfections.

In the compartment below the glass partition 6 is arranged a bank of lights 7, by means of which an intense light is directed through the partition 6. In order to counteract the heating effect of these lights, a fan or blower 8 is provided, and air passages are arranged in the walls of the compartment 9 so that air currents will flow across said compartment below the partition 6 and carry away heat radiated by the lights, thus preventing heating of the partition 6 and possible injury to the quality of the eggs.

The stretches of belt between the pulleys 4 and the housing are supported by means of a plurality of parallel guides 10 which are mounted upon the supporting frame and extend longitudinally between the longitudinal rows of eggs. These guides serve to support the belt when weighted by a large quantity of eggs. The upper surfaces of the guides are all in the same plane and are somewhat higher than the roughened upper surface of the partition 6, so that they normally support the belt clear of said roughened surface. The upper surface of the guides is inclined downwardly at the ends which adjoin the partition 6 so as to allow enough sag to the belt at this point to insure rolling contact of the eggs with said partition.

The parts of the upper surface of the belt which extend outward of the housing serve as receiving and delivery platforms and are preferably surrounded by walls 11, which prevent accidental rolling off of eggs which are not properly seated in the belt. These walls preferably converge downwardly like the walls of a hopper. The end wall 12 at the delivery end of the machine is preferably quite sharply inclined to the surface of the belt, so that it has the effect of lifting the eggs out of their seats in case they come into contact with said wall before having been removed by an operator.

The operation of the device shown is as follows:—Assume that the belt is driven by suitable power in the direction of the arrow on Fig. 1. The speed is such as to allow ample time for a thorough candling or inspection of the eggs during their passage through the housing 1, and also to allow sufficient time for the removal of eggs which are found to be faulty. If the belt is driven in the direction of the arrow, the part of the belt which lies at the left of the housing in Fig. 1 serves as a receiving platform upon which the eggs are placed so that each will be lodged in an individual seat and so that all of the seats will be filled. After the eggs have passed through the housing, they pass before another operator at the delivery end of the machine, where they are inspected in daylight, and sorted as to size, color and cleanliness.

What I claim as my invention and desire to secure by Letters Patent is:—

1. An egg candling machine, comprising a transparent screen, means for directing a strong light through said screen, means for rolling an egg along said screen and comprising a sheet of opaque material fitting around the egg and extending away from it on all sides for obscuring the light around the egg.

2. An egg candling machine, comprising a transparent screen, means for directing a strong light through said screen, means for conveying an egg along said screen with its axis parallel therewith and adapted to cause said egg to roll through contact with said screen, said conveying means comprising means for obscuring the light around the sides of the egg.

3. An egg candling machine, comprising a horizontally disposed conveyer having therein an aperture adapted to serve as a seat for an egg, means on one side of said conveyer for directing a light through said aperture, and means separate from said conveyer for rotating the egg through the movement of the conveyer.

4. An egg candling machine, comprising a horizontally disposed conveyer having therein a series of apertures each adapted to serve as a seat for supporting an egg on said conveyer, means for directing a light upwardly through the apertures in said conveyer at a certain part of the path thereof, said conveyer being of opaque material and adapted to obscure the light except at said apertures, and a supporting surface below said belt adapted to lift the eggs in their seats and cause them to roll in passing said lighting means.

5. An egg candling machine, comprising a conveyer having therein a series of apertures each adapted to serve as a seat for supporting an egg on said conveyer, means for directing a light through said apertures at a certain part of the path of the conveyer, and a surface extending along said certain part of said path and adapted through frictional contact with the eggs to cause them to rotate while opposed to said lighting means.

6. An egg candling machine, comprising a conveyer having therein a series of apertures each adapted to serve as a seat for supporting an egg on said conveyer, means for directing a light through said apertures at a certain part of the path of the conveyer, and a transparent screen parallel with said conveyer and extending along said certain part of said path and adapted through frictional contact with the eggs to cause them to rotate while opposed to said lighting means.

7. An egg candling machine, comprising a conveyer having therein a series of apertures each adapted to serve as a seat for supporting an egg on said conveyer, means for directing a light through said apertures at a certain part of the path of the conveyer, and a transparent screen having a serrated upper surface below and adjacent to said conveyer and extending along said certain part of said path and adapted through frictional contact with the eggs to cause them to rotate while opposed to said lighting means.

8. An egg candling machine, comprising a conveyer having therein a series of apertures each adapted to serve as a seat for supporting an egg on said conveyer, means for directing a light through said apertures at a certain part of the path of the conveyer, and a screen formed of prism glass extending along said certain part of said path and adapted through frictional contact with the eggs to cause them to rotate while opposed to said lighting means.

9. An egg candler, comprising a housing, a horizontally disposed conveyer extending through said housing and a considerable distance outward therefrom at opposite ends, said conveyer having therein a plurality of seats for eggs, being opaque between said seats and being adapted to allow light to pass through said seats, means in said housing for directing light upwardly through said seats, and a supporting surface below the belt and adapted through frictional contact to rotate the eggs in said seats during their passage through the housing.

10. An egg candler, comprising a housing, a horizontally disposed conveyer extending across the interior of said housing, said conveyer having therein a plurality of seats for eggs, being opaque between said seats and being adapted to allow light to pass through said seats, means in said housing for directing light upwardly through said seats, and means for directing an air current between said lighting means and conveyer to prevent heating of the eggs by said lighting means.

11. An egg candler, comprising a housing, a horizontally disposed conveyer extending across the interior of said housing, said conveyer having therein a plurality of seats for eggs, being opaque between said seats and being adapted to allow light to pass through said seats, means in said housing for directing light upwardly through said seats, and a blower for directing an air current along the conveyer across the space between said conveyer and lighting means.

12. An egg candler, comprising a housing, a horizontally disposed conveyer extending across the interior of said housing, said conveyer having therein a plurality of seats for eggs, being opaque between said seats and being adapted to allow light to pass through said seats, means in said housing for directing light upwardly through said seats, and means for circulating a cooling medium between said lighting means and the eggs on the conveyer to prevent heating of the eggs by said lighting means.

Signed at Chicago this 5th day of November, 1907.

S. EDWARD DAVIS.

Witnesses:
EUGENE A. RUMMLER.
MARY M. DILLMAN.